United States Patent [19]

Johansson

[11] Patent Number: 4,487,019

[45] Date of Patent: Dec. 11, 1984

[54] HOISTING GEAR AT PATIENT-LIFTING DEVICES

[76] Inventor: Hans A. V. Johansson, Box 61, Eslov, Sweden, S-241 00

[21] Appl. No.: 580,786

[22] Filed: Feb. 22, 1984

Related U.S. Application Data

[63] Continuation of Ser. No. 256,475, Apr. 22, 1981, abandoned.

[30] Foreign Application Priority Data

May 5, 1980 [SE] Sweden ................................ 8003343

[51] Int. Cl.³ ................................................ F16D 31/02

[52] U.S. Cl. .......................................... 60/481; 60/482; 91/401; 5/81 R

[58] Field of Search .......................... 60/477, 481, 482; 91/401, 394; 92/51, 52, 53, 165 PR; 5/81 R, 81 B, 83; 417/900; 254/93 H

[56] References Cited

U.S. PATENT DOCUMENTS

| | | | |
|---|---|---|---|
| 709,067 | 9/1902 | Waugh | 91/394 |
| 1,510,462 | 10/1924 | Dell . | |
| 2,064,445 | 12/1936 | Nilson | 60/482 |
| 2,557,880 | 6/1951 | Lynn . | |
| 2,624,174 | 1/1953 | Loef | 60/481 |
| 2,961,837 | 11/1960 | Suderow | 92/51 |
| 3,279,755 | 10/1966 | Notenboom et al. | 92/53 |
| 3,417,670 | 12/1968 | Madland | 92/165 R |
| 3,524,385 | 8/1970 | Offestad | 91/394 |
| 3,806,091 | 4/1974 | Wride | 60/482 |
| 3,879,770 | 4/1975 | Grant . | |
| 3,890,684 | 6/1975 | Tallman | 60/481 |
| 4,144,713 | 3/1979 | Clark et al. | 60/482 |
| 4,183,106 | 1/1980 | Grimes et al. . | |

FOREIGN PATENT DOCUMENTS

| | | | |
|---|---|---|---|
| 218780 | 8/1957 | Australia | 60/481 |
| 1029983 | 5/1958 | Fed. Rep. of Germany . | |
| 2007570 | 8/1971 | Fed. Rep. of Germany . | |
| 2127863 | 9/1972 | France . | |
| 363800 | 4/1974 | Sweden . | |
| 18941 | of 1910 | United Kingdom . | |
| 876396 | 8/1961 | United Kingdom . | |

*Primary Examiner*—Robert E. Garrett
*Assistant Examiner*—Richard S. Meyer
*Attorney, Agent, or Firm*—Bacon & Thomas

[57] ABSTRACT

The present invention relates to a hoisting gear for patient-lifting device whereby a plunger device (6) is displaceably mounted in a hydraulic cylinder (4), is supporting patient-carrier means (3) such as a seat or a patient-carrying plate and is raisable my means of a pump device (8) provided to move hydraulic oil between two hydraulic-cylinder chambers (9*a*, 9*b*) separated by the plunger device, and whereby a lowering device (39) is provided to permit lowering of the plunger device by producing a counter flow of hydraulic oil between the hydraulic-cylinder chambers.

In order to obtain by simple means an automatic limitation of the height of the lift the hoisting gear is characterized in that the hydraulic cylinder (4) is on top provided with a stop device (27) limiting the upwards movement of pressure means (22) forming part of the lowering device (39), whereby a valve device (23 and/or 24) mounted on the plunger device (6) reaches said pressure means when said plunger device continues in an upwards direction so that the pressure means (22) controls the valve device to open a counter-flow passage (25 and/or 26) between the hydaulic-cylinder chambers (9*a*, 9*b*).

4 Claims, 5 Drawing Figures

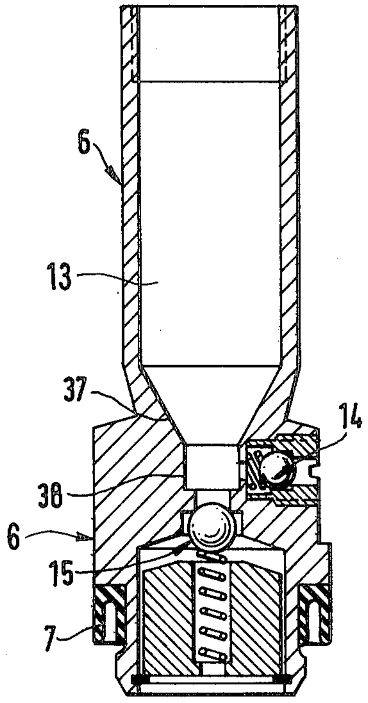
Fig. 4
Fig. 2
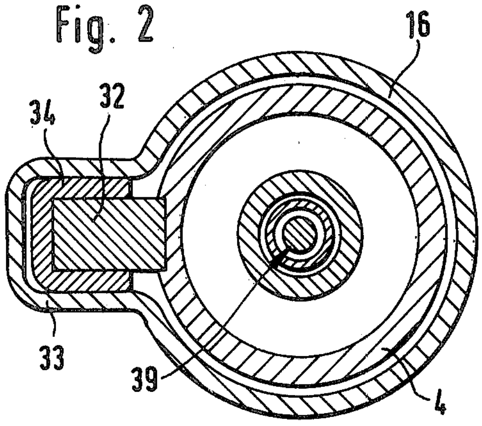
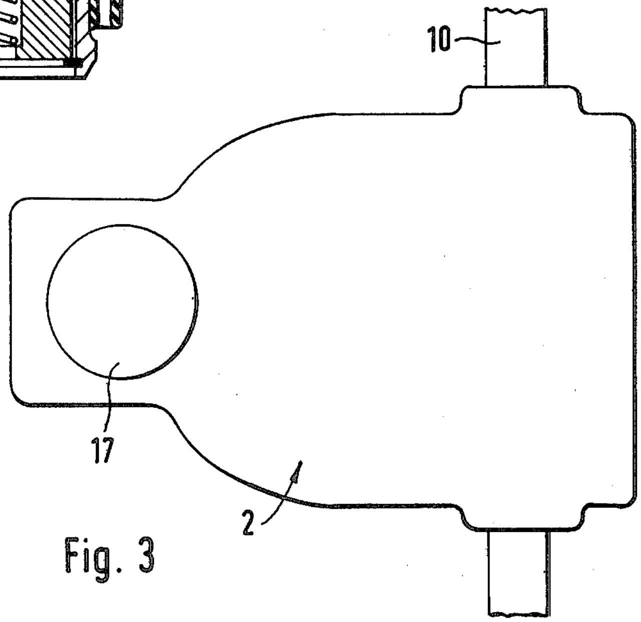
Fig. 3

HOISTING GEAR AT PATIENT-LIFTING DEVICES

This application is a continuation of application Ser. No. 256,475, filed 4/22/81, now abandoned.

The present invention relates to a hoisting gear at patient-lifting devices, where a plunger device is displaceably mounted in a hydraulic cylinder, supports patient-carrier means such as a seat or a patient-carrying plate and is raisable by means of a pump device provided to move hydraulic oil between two hydraulic-cylinder chambers separated by the plunger device and whereby a lowering device is provided to permit lowering of the plunger device by producing a counter flow of hydraulic oil between the hydraulic-cylinder chambers.

The primary object of the present invention is to provide by simple means at the above hoisting gear an automatic limitation of the lifting height. This is arrived at according to the invention by providing the hoisting gear with the features described herein.

The invention will be further described hereinafter with reference to the accompanying drawings, wherein FIG. 1 is a section through the hoisting gear;

FIG. 2 is a section along the line A—A in FIG. 1;

FIG. 3 is a plan view of the hoisting gear;

FIG. 4 is a partial sectional view taken along lines IV—IV in FIG. 1 with the pump plunger omitted for clarity.

The patient transport wagon shown (see FIG. 3) comprises a wheeled frame 1 with a hoisting gear 2 on which is mounted a seat 3 to be raised and lowered by means of the hoisting gear 2.

Figure 1:
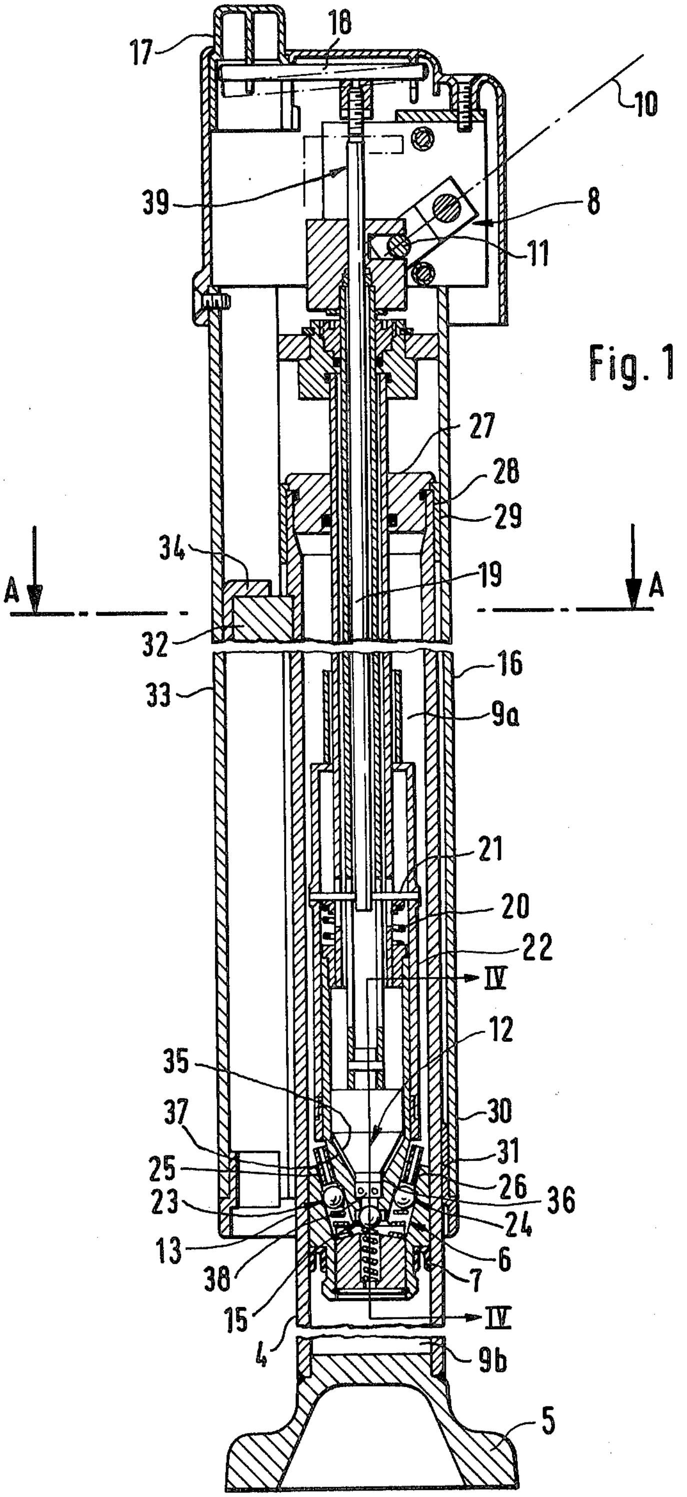

The hoisting gear comprises a hydraulic cylinder 4 (see FIG. 1) which at its lower end is closed by means of a socket 5 and which is mounted on the frame 1 via said socket. A plunger device 6 is displaceably mounted within the hydraulic cylinder 4, said plunger device being provided with sealing means 7 for dividing the hydraulic-cylinder space into an upper chamber **9*a* and a lower chamber 9*b***.

Figure 5:
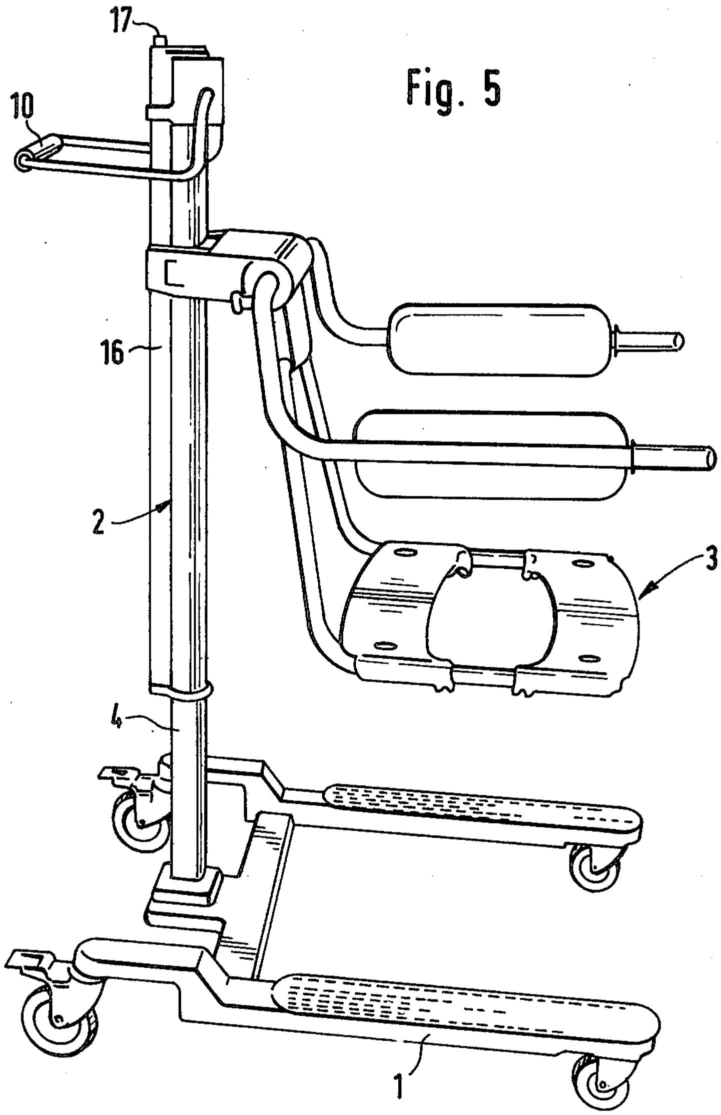
FIG. 5 is a perspective view of a patient transport wagon provided with a hoisting gear according to FIGS. 1-4.

The plunger device 6 is raisable by means of a pump device 8 (see FIG. 1) including a handle 10 which cooperates with a pump plunger 12 via a carrier 11, said pump plunger emerges into a pump cylinder 13 in the plunger device 6. By lifting the pump plunger 12 by means of the handle 10, (see FIG. 5) oil may flow from the upper chamber **9*a* into the pump cylinder 13 via a check valve 14 (see FIG. 4). By pressing down the pump plunger 12 by means of the handle 10, the oil is pressed out of the pump cylinder 13 and into the lower chamber 9*b* via a check valve 15, whereby the plunger device 6 is pressed upwards and lifts the patient-carrier means 3 which is mounted on a tube 16 forming part of the plunger device 6, said tube 16 being mounted on the cylinder 4 and telescopically adjustable therealong. During this upward movement, the lowering device moves upwardly with the plunger device 6, since it is interconnected with the upper portion of carrier tube 16**.

When the plunger device reaches its maximum upward travel, the upper portion of sleeve 22 will engage stop means 27 on the hydraulic cylinder thereby preventing any further upward movement of sleeve 22 and the release means. Further pumping motion will cause plunger device 6 to move upwardly with respect to the sleeve 22 thereby causing engagement with the lower portion of this sleeve and the actuators for valves 23 and 24. When these valves are open, fluid will pass from the lower chamber **9*b* back into the upper chamber 9*a* and will not exert further elevating force on plunger device 6**.

The sleeves defining counterflow passages 25 and 26 bear against the lower portion of sleeve 22 and are moved with respect to plunger device 6 to push ball check valves 23 and 24 off their seats. This opens the counterflow passages 25 and 26.

In order to lower the patient-carrier means 3 a lowering device 39 is provided comprising a push button 17, the movement of which is transferred to a push rod 19 via an arm 18, said push rod being depressable against the action of a resetting spring 20, and the movement of which is transferred to sleeve-like pressure means 22 via a transversal pin 21. When it is desired to lower the carrier tube 16, push button 17 is manually manipulated to thereby cause the lowering means 39 to move downwardly with respect to the plunger device 6. This downward movement once again causes the lower portion of sleeve 22 to unseat ball check valves 23 and 24 and thereby allow fluid from lower chamber **9*b* to pass back into upper chamber 9*a*. The weight supported by the carrier tube 16** causes it to slowly lower its original position.

In order to provide by simple means an overload protection when pumping the plunger device upwards, the hydraulic cylinder 4 is on top provided with a stop device 27 limiting the upwards movement of the pressure means 22, whereby the valve device 23 and/or 24 reaches the pressure means 22 when the plunger device 6 at continued pumping proceeds in an upwards direction such that the pressure means 22 controls the valve device 23 and/or 24 to open the passage 25 and/or 26 for permitting oil to flow back from the lower chamber **9*b* to the upper chamber 9*a*. Due to this structure the plunger device 6** will not raise above a certain limit irrespective of how much you pump.

In order to minimize the number of members in the hoisting gear, the stop device 27 may also function as a cap for closing the upper end portion 28 of the hydraulic cylinder 4 such that the upper chamber **9*a*** is closed also at the top.

A very effective guiding of the plunger device 6 while maintaining maximum height of lift is obtained by providing the upper end portion 28 of the hydraulic cylinder 4 with guide means 29 for guiding the tube 16, said tube being guided also by the hydraulic cylinder while said cylinder at its lower portion 30 is provided with guide means 31.

In order to prevent the plunger device 6 from rotating relative to the hydraulic cylinder 4 without limiting the height of lift, the hydraulic cylinder is at the top provided with a radially extending flange 32 engaging a longitudinal guide portion 33 on the tube 16. Preferably, the flange 32 is provided with a housing 34 of low-friction material for not obstructing the movement of the tube 16.

In order to reduce unpleasant spring-back tendencies at the end of each pump stroke downwards, the pump plunger 12 has a conically tapering end portion 35 which is transformed into a cylindrical gudgeon 36, whereby the pump cylinder 13 has a corresponding conically tapering end portion 37 with a recess 38 into which the cylindrical gudgeon 36 of the pump plunger 12 fits. Hereby, downward directed pump stokes are further damped and spring-back tendencies are totally or substantially eliminated.

The hoisting gear illustrated in the drawings has several additional members such as sealing rings, valve springs, etc., which have no direct connection to the invention and are therefore not further described. The construction of the hoisting gear according to the invention may of course vary within the scope of the following claims.

What I claim is:

1. A hoisting gear for a patient-lifting device comprising:

(a) an hydraulic cylinder attached to a frame;

(b) a plunger device displaceably mounted within the hydraulic cylinder and dividing the interior of the hydraulic cylinder into an upper chamber and a lower chamber, the plunger device further defining a pumping cylinder;

(c) a carrier tube attached to the plunger device so as to move therewith, the tube surrounding at least a portion of the outer surface of the hydraulic cylinder;

(d) carrier means attached to the carrier tube to support a load thereon;

(e) a pump plunger displaceably disposed within the pumping cylinder;

(f) means to move the pump plunger in a suction stroke and a pumping stroke;

(g) first valve means to allow hydraulic fluid to pass from the upper chamber into the pumping cylinder during the suction stroke of the pump plunger (h) second valve means to allow hydraulic fluid to pass from the pumping cylinder into the lower chamber during the pumping stroke of the pump plunger so as to elevate the plunger device and carrier tube with respect to the hydraulic cylinder;

(i) third valve means in the plunger device, the third valve means being normally closed to prevent hydraulic fluid from passing from the lower chamber into the upper chamber;

(j) a lowering device comprising:

(i) a sleeve slidably mounted on the plunger device;

(ii) manually actuable pushbutton means attached to the carrier tube; and, (iii) connecting means connecting the pushbutton means to the slidable sleeve such that, when the pushbutton means is manually actuated, the slidable sleeve opens the third valve means to allow hydraulic fluid to flow from the lower chamber into the upper chamber, thereby lowering the plunger device and the carrier tube with respect to the hydraulic cylinder; and, (k) a stop device attached to the upper end of the hydraulic cylinder which limits the upward travel of the plunger device by contact with the slidable sleeve thereby automatically opening the third valve means and preventing further elevation of the plunger device and carrier tube with respect to the hydraulic device.

2. Hoisting gear according to claim 1 further comprising first guide means attached to the upper end of the hydraulic cylinder and bearing against the carrier tube, and second guide means attached to the lower end of the carrier tube and bearing against the hydraulic cylinder.

3. Hoisting gear according to claim 1 wherein the carrier tube has a longitudinally extending guide portion and further comprising a radial flange extending from the top of the hydraulic cylinder adjacent the stop device and engaging the guide portion to prevent relative rotation between the carrier tube and the hydraulic cylinder.

4. Hoisting gear according to claim 1 wherein the pumping cylinder has a conically tapered end portion with cylindrical recess at its apex and wherein the plunger device has a pump plunger with a corresponding conically tapered end portion having a cylindrical gudgeon extending from its apex, the diameter of the cylindrical gudgeon being slightly smaller than that of the cylindrical recess to allow the gudgeon to enter the recess.

* * * * *